United States Patent [19]

Johnston

[11] Patent Number: 5,190,299
[45] Date of Patent: Mar. 2, 1993

[54] RADIALLY UNDULATING SHAFT SEAL

[75] Inventor: David E. Johnston, Weinheim, Fed. Rep. of Germany

[73] Assignee: Firma Carl Freudenberg, Weinheim/Bergstrasse, Fed. Rep. of Germany

[21] Appl. No.: 781,787

[22] Filed: Oct. 23, 1991

[30] Foreign Application Priority Data

Jan. 23, 1991 [DE] Fed. Rep. of Germany ....... 4101835

[51] Int. Cl.$^5$ .............................................. F16J 15/32
[52] U.S. Cl. .................................. 277/152; 277/134; 277/153
[58] Field of Search ............... 277/134, 152, 153, 133, 277/207 R

[56] References Cited

U.S. PATENT DOCUMENTS

| 3,501,155 | 3/1970 | Dega et al. | 277/134 X |
| 3,534,969 | 10/1970 | Weinland | 277/134 X |
| 3,633,927 | 1/1972 | Van Deven | 277/134 |
| 4,427,205 | 1/1984 | Hölzer et al. | 277/134 |
| 4,750,747 | 6/1988 | Hölzer | 277/134 |

FOREIGN PATENT DOCUMENTS

| 1153578 | 9/1959 | Fed. Rep. of Germany . | |
| 1196451 | 6/1970 | United Kingdom | 277/134 |
| 1220985 | 1/1971 | United Kingdom | 277/134 |

Primary Examiner—William A. Cuchlinski, Jr.
Assistant Examiner—Daniel G. DePumpo
Attorney, Agent, or Firm—Sprung Horn Kramer & Woods

[57] ABSTRACT

A radially undulating shaft seal having a seal axis and a lip of polymeric material that surrounds the shaft to be sealed. The lip is demarcated on the inside by an inner surface that tapers out in the form of a hollow cone toward the side facing away from the space being sealed; the lip also has ribs that project radially inward distributed uniformly around it. The ribs (3) consist of undulations propagated along the inner surface (2.1) parallel with the circumference. The difference between the adjacent maximal and minimal intervals (4 & 5) along the circumference between the inner surface and the axis (6) is less than 0.3 mm.

11 Claims, 2 Drawing Sheets

RADIALLY UNDULATING SHAFT SEAL

BACKGROUND OF THE INVENTION

The present invention concerns a radially undulating shaft seal having a seal axis and a lip of polymeric material that surrounds the shaft to be sealed, wherein the lip is demarcated on the inside by an inner surface that tapers out in the form of a hollow cone toward the side facing away from the space being sealed and wherein the lip has ribs that project radially inward, distributed uniformly around it.

A radially undulating shaft seal of this type is known from the German Pat. No. 1 153 578. It has undulating ribs on the face of its lip that, in conjunction with a lip-traveling surface that has ribs that extend at an angle to the axis of the seal, pump the medium being sealed toward the space being sealed. The operational life of such a radially undulating shaft seal is not entirely satisfactory. When the lip on the seal is inadequately lubricated, it is subjected to excessive wear by the rotating shaft. As time passes the seal will accordingly become less effective, especially at times when the shaft is not moving.

SUMMARY OF THE INVENTION

The principal object of the present invention is to improve a radially undulating shaft seal of the aforesaid type to the extent that it will maintain a longer lasting and more effective sealing action and will prevent the space being sealed from leaking, whether or not the shaft is rotating.

This object, as well as other objects which will become apparent from the discussion that follows, are achieved, in accordance with the invention by forming the ribs in the radially undulating shaft seal to consist of undulations propagated along the inner surface parallel with the circumference such that the difference between the circumferentially adjacent maximal and minimal distances between the inner surface and the axis is less than 0.3 mm. The advantage of this design is that, since the radially inward oriented ribs are tensioned against the shaft while the radially outward oriented ribs just come into contact with, or remain slightly apart from the surface of the shaft, the undulating inner surface will generate a axial pumping action toward the space being sealed. The embodiment of a radially undulating shaft seal in accordance with the invention will accordingly exhibit outstanding lubrication between the lip and the adjacent shaft, leading to extraordinarily low wear on the sealing surface and very long life accompanied by satisfactory sealing properties.

The extent of the pumping action depends upon the angle of the lip. Another advantage is that, while the radially undulating shaft seal in accordance with the invention can seal fluid-filled spaces from the environment, the pumping action generated by the seal will also forward liquid past the lip and into the sealed-off space and keep it there. The medium is entrained by the differences in the distance between the seal's inner surface and the seal axis as the shaft rotates and is constantly returned to the sealed-off space. The extremely narrow gap between the shaft and the sealing surface will also prevent medium from leaking out even when the shaft is at rest.

This action depends on such specific external conditions as the geometry of the inner surface, how far it is from the axis, the width of the lip, and the angle between the lip and the axis. Also determinative are the radially undulating shaft seal's elastomeric coefficients and the radial force it is subject to. It is generally of advantage for the difference between the adjacent circumferentially maximal and minimal distances between the inner surface and the axis to be less than 0.3 mm.

The inner surface can be constructed from the surfaces of a series of imaginary cones along the circumference with axes alternatingly radially inside and radially outside the lip. The regular undulations in the conical surfaces ensure uniform restoration of the medium to the sealed-off space.

Another advantage is that the regular conical surfaces are simple and economical to manufacture.

The inner surface can undulate sinusoidally along the circumference. The different slopes along the sine curve will generate forwarding actions that differ in strength in different areas of the lip. The sinusoidal inner surface makes the radially undulating shaft seal especially adaptable to media of various viscosities.

The difference between the circumferentially adjacent maximal and minimal distances between the inner surface and the axis can be less than 0.15 mm and is preferably less than 0.1 mm. The smaller the difference between the distances between the undulating inner surface and the axis, the more powerful will the forwarding action be toward the space being sealed off. Since the sealing action increases as the difference between the distances decreases, differences of less than 0.1 mm will be preferable for handling less viscous medium. Major differences of between 0.1 and 0.3 are economically attainable and appropriate for handling more viscous mediums.

The radially undulating shaft seal in accordance with the invention will be adapted to the particular conditions in accordance with the various parameters when the inner surface between adjacent undulation crests extends at least 1.5 mm in the direction of the circumference. A distance of at least 1.5 mm between adjacent crests will be particularly applicable in radially undulating shaft seals with a comparatively short inside diameter.

Radially undulating shaft seals that are used to seal shafts with larger diameters can have an inner surface that extends at least 5 mm along the circumference between adjacent undulation crests. At least two complete undulations must occur along the inner surface no matter how far it extends along the circumference between adjacent undulation crests. The angle between the inner surface of the undulation and the adjacent surface of the shaft will decrease as the distance between crests increases. This feature will improve both the sealing action, especially while the shaft is at rest, and the return of the medium to the sealed space while the shaft is rotating.

The inner surface can have an axial length of at least 1 mm. The advantage is reliable static and dynamic sealing of the shaft and low stress on the inner surface of the radially undulating shaft seal. When the inner surface is at least 1 mm long axially, the life of the seal will be considerably prolonged due to the lower specific stress on the sealing surface.

The inner surface can be axially demarcated on each side by faces perpendicular to the axis. This advantageous embodiment results in a more precisely defined radial force on the shaft by the inner surface. An inner surface that is axially demarcated on each side by faces that extend perpendicular to the axis will also be substantially easier to manufacture.

The inner surface on the side of the lip that faces away from the sealed-off space can be at an angle of 3° to 20° to the axis. The pumping action and the sealing function can be adapted to the particular conditions of a specific application by way of the medium being handled and the peripheral speed of the shaft.

An especially advantageous action in relation to the function of the radially undulating shaft seal and its life will result when the inner surface on the side of the lip that faces away from the sealed-off space is at an angle of 3.123° to 3.875° to the axis.

The preferred embodiment of the present invention will now be described with reference to the accompanying drawings.

DESCRIPTION OF THE PREFERRED EMBODIMENT

Figure 1:
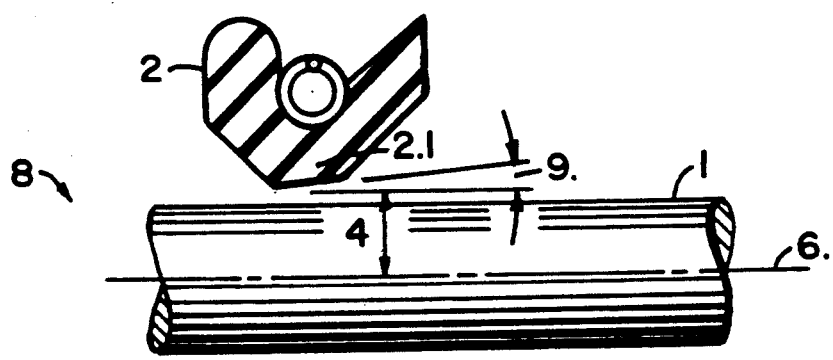
FIG. 1 is a very large-scale section, taken along the line A—A of FIG. 3, through a radially undulating shaft seal mounted on a shaft.

FIG. 1 illustrates an essential part of a radially undulating shaft seal with a seal and shaft axis 6. The seal has a lip 2 of polymeric material that surrounds a shaft 1 and seals off the space 8 on the left lateral side of seal from the space on the right (in the sense of the drawing). Lip 2 is demarcated inside by an inner surface 2.1 that tapers out in the form of a hollow cone toward the side facing away from the sealed space 8. The inner surface 2.1 of lip 2 is represented in the vicinity of its maximal elevation off shaft 1. The comparatively long axial extension of inner surface 2.1 results in a capillary action that ensures a satisfactory static seal with respect to sealed space 8. As shaft 1 rotates, the undulating inner surface 2.1 of lip 2 generates a forwarding or pumping action toward sealed space 8. FIG. 1 represents the maximal distance 4 between inner surface 2.1 and axis 6. The inner surface 2.1 on the side that faces away from the sealed space 8 is at an angle 9 of 3° to 20° with respect to the axis. The angle in this particular case is approximately 6°.

Figure 2:
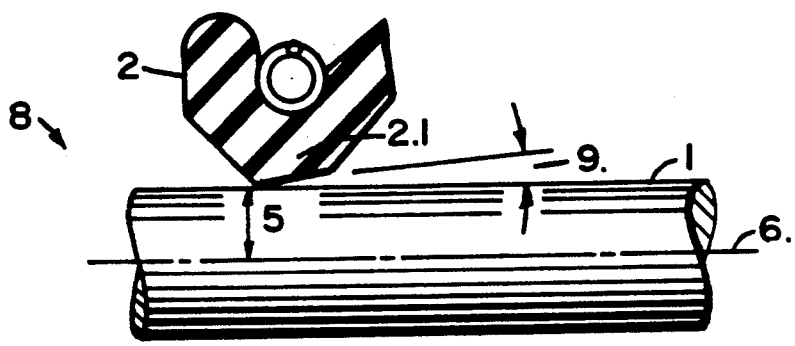
FIG. 2 is a section, taken along the line B—B of FIG. 3, through the radially undulating shaft seal of FIGS. 1 and 3.

FIG. 2 illustrates the same seal illustrated in FIG. 1 at another point along its circumference. This Figure represents the minimal distance 5 between inner surface 2.1 and axis 6. The inner surface at this point is tensioned against shaft 1. In this case as well the angle 9 between inner surface 2.1 and axis 6 is approximately 6°.

Figure 3:
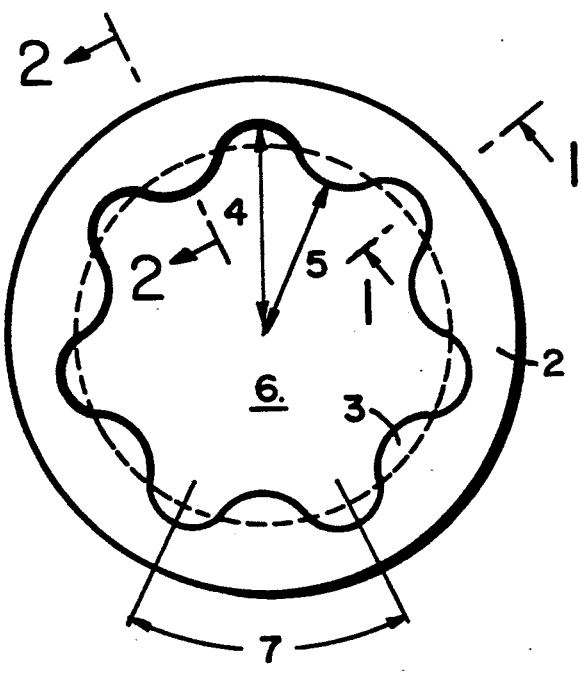
FIG. 3 is a plan view of the shaft seal in accordance with the preferred embodiment of the present invention.

FIG. 3 is a view of the radially undulating shaft seal illustrated in FIGS. 1 and 2. The maximal distance 4 and the minimal distance 5 between inner surface 2.1 and axis 6 are represented in highly exaggerated form to illustrate how the device operates. Inner surface 2.1 undulates sinusoidally around the inner circumference of the seal. Between the crests of the adjacent undulations is a circumferential distance 7. No matter what size the radially undulating shaft seal is, there will be at least two complete undulations with a distance 7 between them along the inner circumference.

Figure 4:
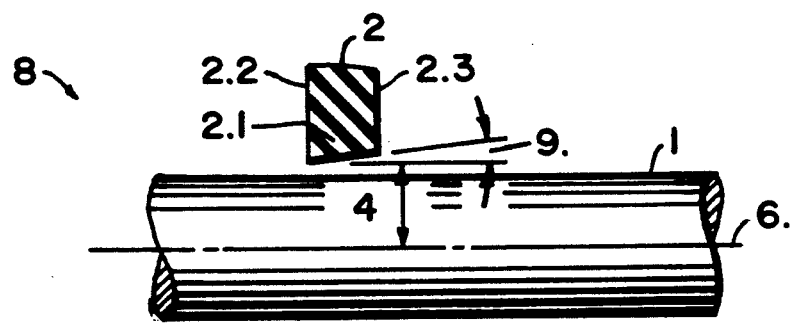
FIGS. 4 and 5 are very large-scale sections, in FIG. 4 along the line A—A and in FIG. 5 along the line B—B of FIG. 3, of the lip of the radially undulating shaft seal with its inner surface axially demarcated on each side by faces that extend perpendicular to the axis.

FIG. 4, like FIG. 1, illustrates the maximal distance 4 between lip 2 and axis 6. Again, inner surface 2.1 is not in contact with shaft 1

The inner surface 2.1 of lip 2 is illustrated highly magnified and will be at least 1 mm long axially in any operable embodiment. The inner surface 2.1 is axially demarcated by faces 2.2 and 2.3 that extend perpendicular to the seal axis 6. The faces precisely dictate the radial stress on inner surface 2.1.

Figure 5:
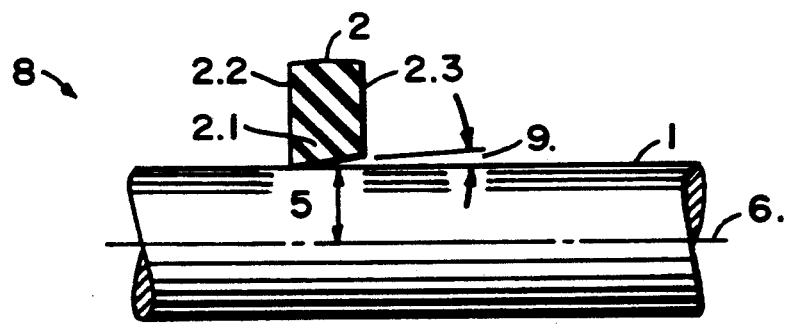

FIG. 5 illustrates the minimal distance 5 between the lip illustrated in FIG. 4 and the seal axis 6. As in FIG. 2, the lip is pressed against the surface of shaft 1.

There has thus been shown and described a novel radially undulating shaft seal which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention, which is to be limited only by the claims which follow.

What is claimed is:

1. In a shaft seal having a central seal axis and a lip of resilient material that surrounds a shaft to be sealed, the shaft seal defining a sealed space when mounted on a shaft, wherein the lip is demarcated by a radially inner sealing surface that tapers in the form of a hollow cone from a surface of minimum diameter adjacent the side facing the sealed space toward a surface of larger diameter adjacent the side facing away from the sealed space, and wherein the lip has ribs that project radially inward, distributed uniformly around it, the improvement wherein the ribs consist of undulations propagated along the inner sealing surface in the circumferential direction of the seal, and wherein the difference between the circumferentially adjacent maximal and minimal distances between the inner sealing surface and the seal axis is less than 0.3 mm.

2. The shaft seal defined in claim 1, wherein the inner sealing surface is constructed from the surfaces of a series of imaginary cones along the circumference with axes alternatingly radially inside and radially outside the lip.

3. The shaft seal defined in claim 1, wherein the inner sealing surface undulates sinusoidally in the circumferential direction of the seal.

4. The shaft seal defined in claim 1, wherein the difference between the circumferentially adjacent maximal and minimal distance between the inner sealing surface and the seal axis is less than 1.5 mm.

5. The shaft seal defined in claim 1, wherein the difference between the circumferentially adjacent maximal and minimal distances between the inner sealing surface and the seal axis is less than 0.1 mm.

6. The shaft seal defined in claim 1, wherein the inner sealing surface between circumferentially adjacent undulation crests extends for a distance of at least 0.15 mm.

7. The shaft seal defined in claim 1, wherein the inner sealing surface between circumferentially adjacent undulation crests extends for a distance of at least 5 mm.

8. The shaft seal defined in claim 1, wherein the inner sealing surface has an axial length of at least 1 mm.

9. The shaft seal defined in claim 1, wherein the inner sealing surface is axially demarcated on each face side of the seal by surfaces perpendicular to the seal axis.

10. The shaft seal defined in claim 1, wherein the internal surface of the hollow cone forming the inner sealing surface that faces away from the sealed space is at an angle of 3° to 20° to the axis.

11. The shaft seal defined in claim 1, wherein the internal surface of the hollow cone forming the inner sealing surface that faces away from the sealed space is at an angle of 3.123° to 3.875° to the axis.

* * * * *